United States Patent
Drissi et al.

(10) Patent No.: US 9,129,108 B2
(45) Date of Patent: Sep. 8, 2015

(54) SYSTEMS, METHODS AND COMPUTER PROGRAMS PROVIDING IMPACT MITIGATION OF CYBER-SECURITY FAILURES

(71) Applicant: International Business Machines Corporation, Armonk, NY (US)

(72) Inventors: Youssef Drissi, Ossining, NY (US); Rick A. Hamilton, II, Charlottesville, VA (US); Colin George Harrison, Brookfield, CT (US); Jack Lawrence Kouloheris, Ossining, NY (US); Pratap Chandra Pattnaik, Ossining, NY (US); Josyula R. Rao, Briarcliff Manor, NY (US); Chung-Sheng Li, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/675,494

(22) Filed: Nov. 13, 2012

(65) Prior Publication Data
US 2013/0198840 A1    Aug. 1, 2013

Related U.S. Application Data

(60) Provisional application No. 61/593,035, filed on Jan. 31, 2012.

(51) Int. Cl.
*G06F 21/00*     (2013.01)
*H04L 29/06*     (2006.01)
(Continued)

(52) U.S. Cl.
CPC .............. *G06F 21/55* (2013.01); *G06F 21/552* (2013.01); *G06F 21/577* (2013.01); *H04L 9/0891* (2013.01)

(58) Field of Classification Search
CPC ..... G06F 21/55; G06F 21/577; G06F 21/552; H04L 9/0891
USPC .......... 726/22; 713/168; 380/273; 705/317, 8
See application file for complete search history.

(56) References Cited

U.S. PATENT DOCUMENTS 8,065,725 B2 * 11/2011 Zheng et al. .................... 726/22
2010/0153156 A1 * 6/2010 Guinta et al. .................... 705/8
2010/0180116 A1 * 7/2010 Coan et al. .................... 713/168
(Continued)

FOREIGN PATENT DOCUMENTS

WO    WO 2013192477 A1 * 12/2013

OTHER PUBLICATIONS

Jones, A.; Zhaodan Kong; Belta, C.; "Anomaly detection in cyber-physical systems: A formal methods approach"; Decision and Control (CDC), 2014 IEEE 53rd Annual Conference on DOI: 10.1109/CDC.2014.7039487; Publication Year: Dec. 2014; pp. 848-853.*

*Primary Examiner* — Kambiz Zand
*Assistant Examiner* — Courtney Fields
(74) *Attorney, Agent, or Firm* — Harrington & Smith; Louis J. Percello (57) ABSTRACT

Disclosed is a method and system to operate a governed data processing system in concert with a governing data processing system. The method includes operating a secure governing data processing system to monitor operation of at least one governed data processing system to detect a deviation from modeled user and governed data processing system behavior. The method further includes, upon detecting a deviation from the modeled behavior, taking proactive action to mitigate an occurrence of a potential adverse result of an occurrence of a cyber-security threat.

25 Claims, 7 Drawing Sheets

(51) Int. Cl.
*G06F 21/55* (2013.01)
*H04L 9/08* (2006.01)
*G06F 21/50* (2013.01)
*G06F 21/57* (2013.01)
*G06F 11/30* (2006.01)

(56) References Cited

U.S. PATENT DOCUMENTS

2012/0011077 A1* 1/2012 Bhagat .......................... 705/317
2013/0305357 A1* 11/2013 Ayyagari et al. ................ 726/22

* cited by examiner

SYSTEMS, METHODS AND COMPUTER PROGRAMS PROVIDING IMPACT MITIGATION OF CYBER-SECURITY FAILURES

CLAIM OF PRIORITY FROM COPENDING PROVISIONAL PATENT APPLICATION

This patent application claims priority under 35 U.S.C. §119(e) from Provisional Patent Application No. 61/593,035, filed Jan. 31, 2012, the disclosure of which is incorporated by reference herein in its entirety.

TECHNICAL FIELD

The exemplary embodiments of this invention relate generally to data processing systems, software and methods, and more specifically to security techniques and methodologies for protecting computer systems, software and data (cyber-security techniques and methodologies) in both real and virtual instantiations, such as cloud-based instantiations using virtual machines.

BACKGROUND

Significant cyber-security challenges already exist and can be expected to increase as markets move towards systems with fully integrated servers, storage, networks in a dense server/storage environment. It has been documented that the occurrence of malicious attacks has recently surpassed the occurrence of human error. As a result of these trends providing effective cyber-security has become an important priority for many public and private enterprises in order to reduce intellectual property, monetary and other types of losses.

SUMMARY

In one exemplary aspect thereof the embodiments of this invention provide a method to operate a governed data processing system in concert with a governing data processing system. The method includes operating a secure governing data processing system to monitor operation of at least one governed data processing system to detect a deviation from modeled user and governed data processing system behavior. The method further includes, upon detecting a deviation from the modeled behavior, taking proactive action to mitigate an occurrence of a potential adverse result of an occurrence of a cyber-security threat. In the method operating the secure governing data processing system to monitor operation of the at least one data processing system comprises capturing data from the at least one governed data processing system, assimilating the captured data, performing modeling, monitoring and analyzing of the assimilated data; using the modeling, monitoring and results of the analyzing to identify a potential cyber-threat and to suggest at least one action or countermeasure to be taken to counter the potential cyber-threat, and implementing at least one of the suggested actions or countermeasures.

DETAILED DESCRIPTION

The present invention relates in part to a methodology by which cyber-security failures may be prevented and/or their impacts mitigated, and more specifically, to a proactive, oversight/governing system that aids in monitoring and proactively preventing an impending potential failure, or surviving (if prevention is impossible) an impending potential failure in a governed system.

The examples of the embodiments of this invention provide a holistic methodology and framework for preventing and/or mitigating the impacts of cyber-security failures which pose ever-increasing challenges to businesses, systems and infrastructures. Some existing cyber-security systems generally do an adequate job of preventing known problems that have known solutions (e.g., a specific anti-virus for a specific virus, a specific response to a known type of attack, a specific patch for a specific application weakness). However, it can be shown that the failure rate of these conventional approaches is relatively high—with failures ranging from those due to human error to coordinated attacks and natural disasters. In particular, the shifting and evolving nature of cyber-security threats makes existing cyber-security systems and approaches vulnerable to new types of threats and to as yet unknown problems.

As opposed to focusing only on specific threats the embodiments of this invention focus instead on providing an optimal over-arching framework that enables a systemic and stable approach for addressing known types of failures, and anticipating (or at least being better prepared for) new types of failures. The systemic framework is itself enabled by use of data capture techniques from the ambient environment and advanced modeling, analytics and learning technologies that permit new cyber-security approaches to be deployed.

Figure 1:
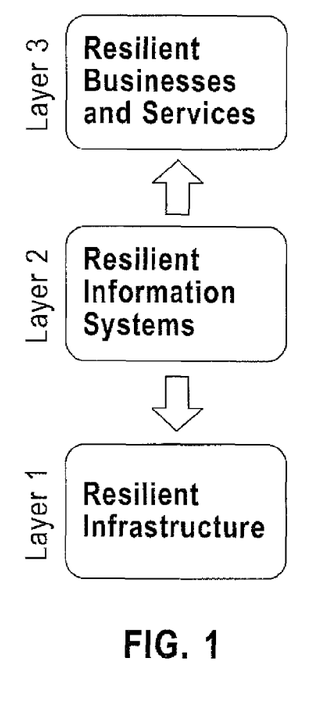
FIG. 1 shows multiple levels of resiliency that can be found in some information processing systems.

Referring to FIG. 1, in general there are multiple layers of resiliency:

Layer 1 Resilient physical infrastructure and environment
Layer 2 Resilient IT infrastructure (e.g. Clouds)
Layer 3 Resilient Industry solutions (e.g. supply chain management, financial risk, Government)

The exemplary embodiments of this invention are primarily concerned with Layer 2 and Layer 3.

Figure 2:
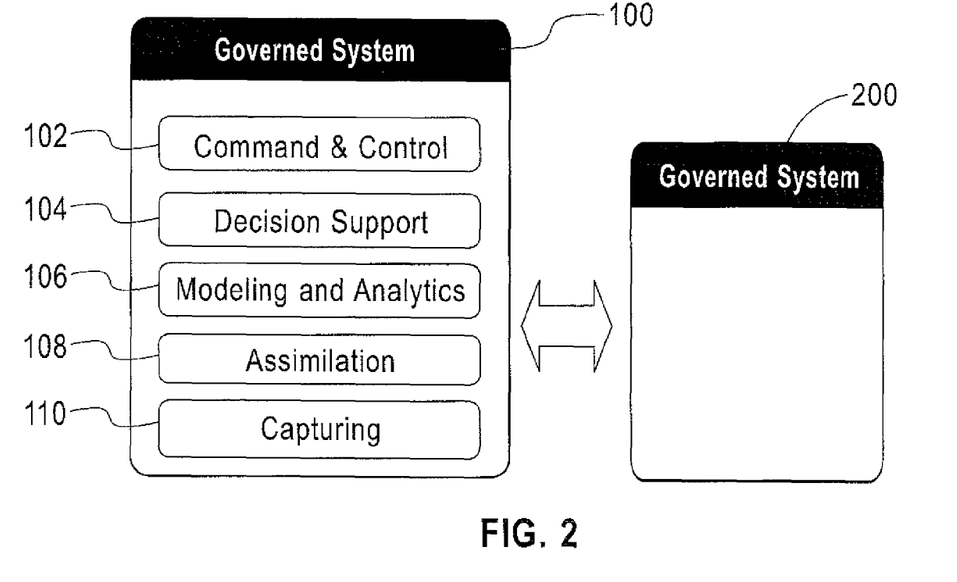
FIG. 2 illustrates a concept of a governing system and its relationship to a governed system.

FIG. 2 illustrates the concept of a governing system 100 and its relationship to a governed system 200. The governing system 100 can be assumed to be embodied as a secure, locked-down system that is an aspect of this invention.

Figure 7:
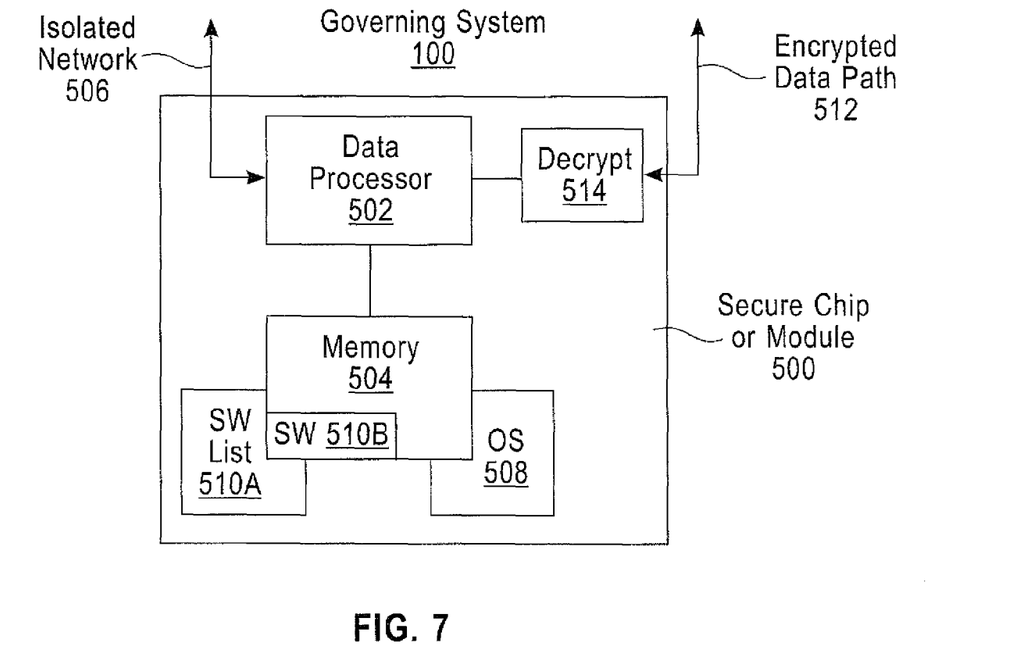
FIG. 7 is a simplified block diagram of an embodiment of the governing system embodied securely within a chip or module.

As is shown in FIG. 7 the governing system 100 can be embodied securely within a chip or module 500 that operates high grade security system(s) with all or some of: one or more data processors 502 connected with local memory 504; an isolated communications network 506 (a physical or logical network not directly connected to an external network such as a LAN or the internet); a preferably reduced functionality operating system (OS) 508, a stripped-down OS providing a readily controlled and manageable environment; generally un-modifiable software 510B (a finite list 510A can be provided of what software 510B can be installed and verified using securely stored signature(s)); and the use of an encrypted data path or paths 512 to and from the chip 500, the data being decrypted at element 514 only inside the chip 500 using one or more decryption keys that are securely stored within the chip 500. In practice an encryption function can be implemented at the governed system 200.

Preferably the OS 508 is a different OS then the OS of the governed system 200 thereby minimizing an impact of any malware targeted at the type of OS run by the governed system 200. The software 510B can be considered as including at least the software needed to implement the various functions of command and control 102, decision support 104, modeling and analytics 106, assimilation 108 and data capture 110 that are detailed below, as well as possibly the meta-learning embodiments described in relation to FIG. 6. Note that in some embodiments at least a portion of the memory 504, such as disk-based memory, could be located external to the secure chip or module 500.

Note that in the following description the "governing system 100" can refer primarily to a logical implementation, as opposed to the governed system 200 from which data is captured, and assimilated, and for which models and analytics are built to support decisions and command and control actions.

Operational aspects of the governing system 100, described in further detail below, include command and control 102, decision support 104, modeling and analytics 106, assimilation 108 and data capture 110. These can all be represented as the various software applications and elements 510B securely stored in the memory 504 shown in FIG. 7.

Figure 3:
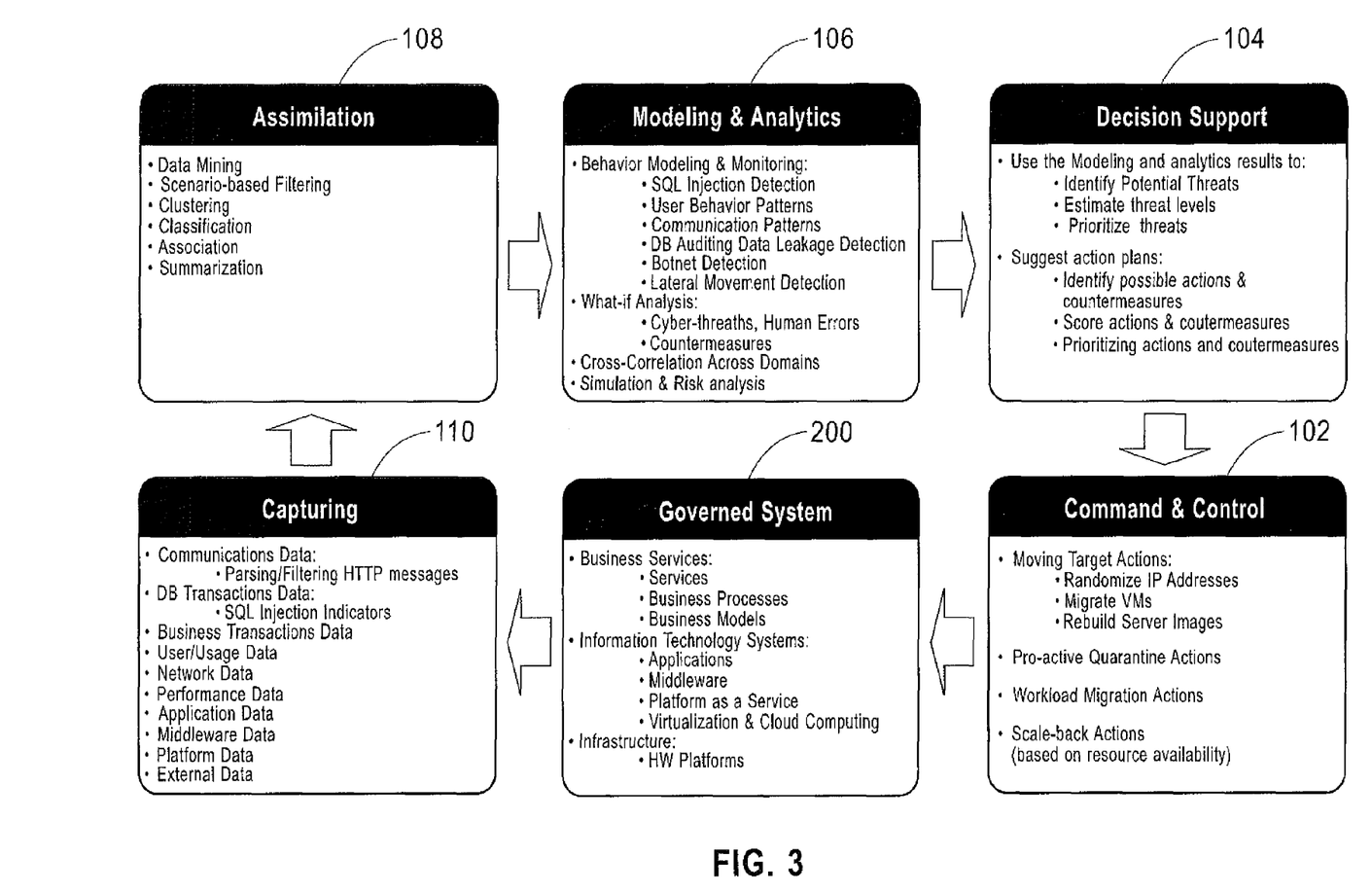
FIG. 3 illustrates operational aspects of the governing system in relation to the governed system.

FIG. 3 shows the foregoing operational aspects of the governing system 100 in relation to the governed system 200. A methodology is presented by which cyber-security failures may be prevented or their impacts mitigated through the use of the proactive oversight/governing system 100. The governing system 100 performs monitoring of the governed system 200 and proactively prevents if possible an upcoming potential failure. If for some reason prevention of the failure is not possible then the governing system 100 enables the governed system 200 to survive the occurrence of the failure. More specifically the governing system 100 uses a well-reasoned process of capturing data 110, assimilating such data 108, modeling and predictive analysis 106, providing outputs from such analysis as inputs to decision support processes 104, and executing command and control operations 102 to achieve the desired effects. The embodiments of the governing system 100 further focus on models, variables, data and learning which are optimized to adapt a generalized process to the specific application of cyber-security failures. The embodiments of the governing system 100 provide resiliency for business and other services, systems and solutions.

The embodiments of this invention employ continuous monitoring and analytics of the environment, model-based reasoning and the orchestration of a proactive response. The embodiments of the governing system 100 can be applied to solving the problems stated above, with broad generalizations of its fundamental approach (see details below), enabling (1) an end-to-end closed-loop multi-tier approach within a well-defined system boundary; (2) proactive orchestration to ensure maximal resilience for workloads with highest value-at-risk by leveraging all available virtualized resources; and the (3) heavily guarded/hardened/secured governing system 100.

Figure 4A:
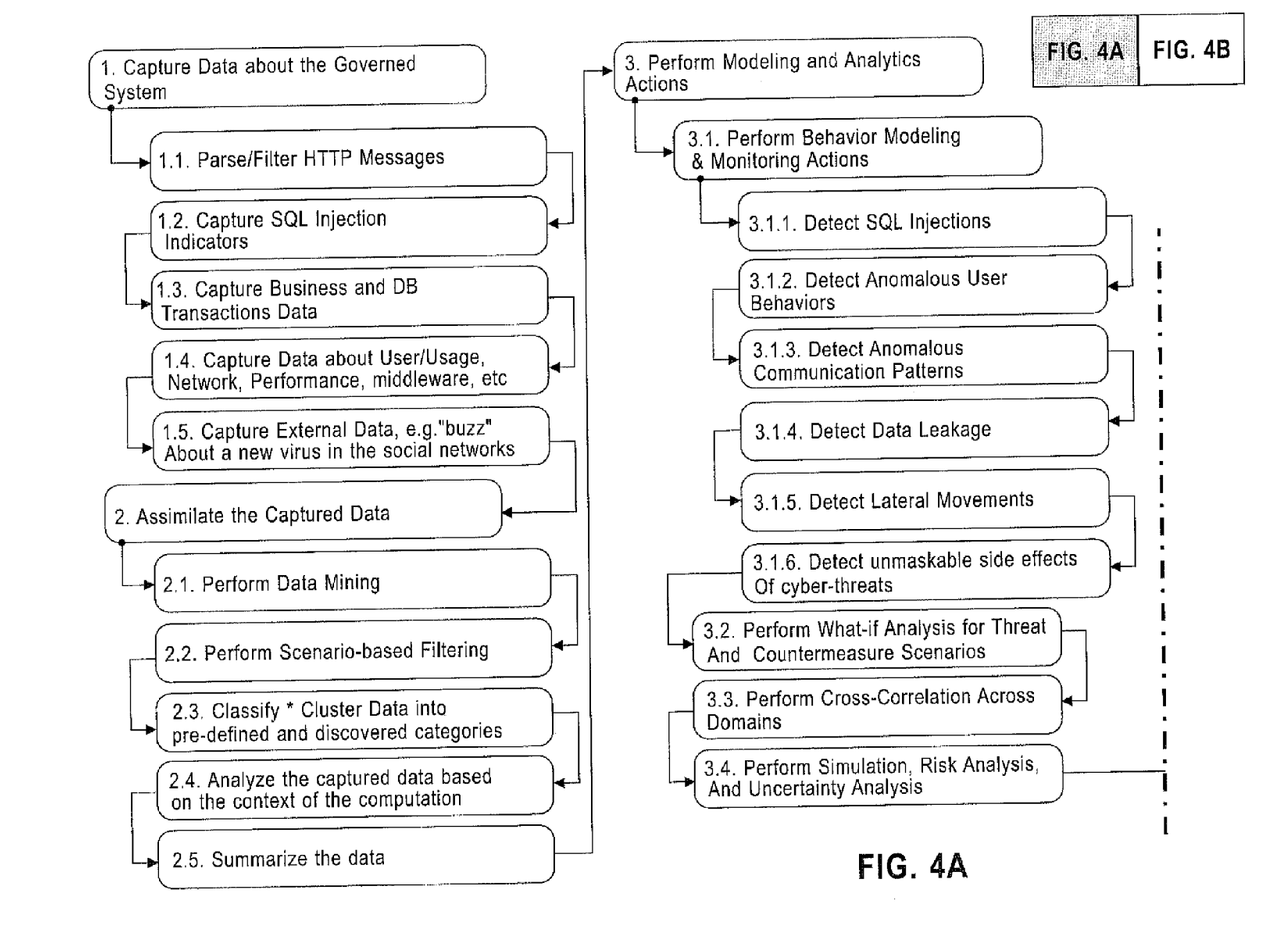
FIG. 4A-4B is a process flow diagram and flow chart that depicts an example of a method in accordance with the exemplary embodiments of this invention, such as the embodiment shown in FIG. 3.
Figure 4B:
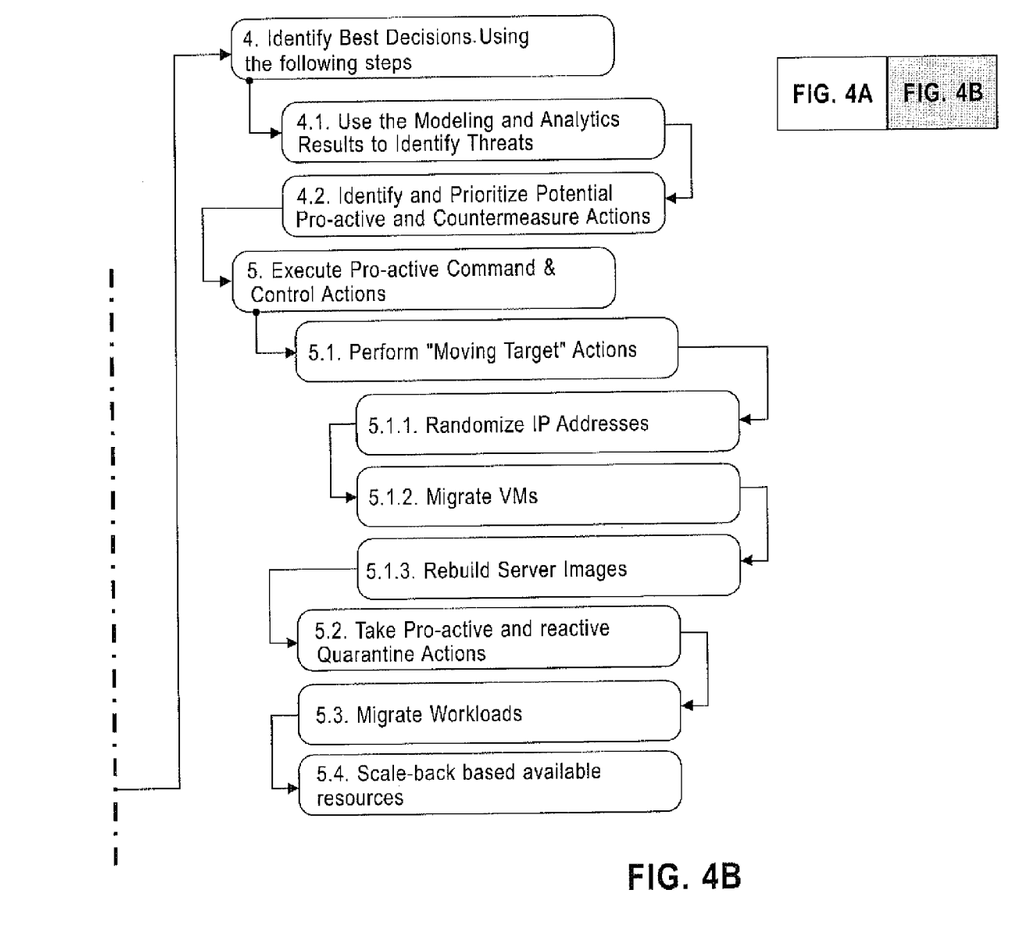

Referring to FIG. 3 and to the process flow diagram of FIG. 4, the capturing element 110 can operate at Step 1, for example, by parsing/filtering HTTP messages (1.1) and by capturing database (DB) transactions data such as, but not limited to, SQL injection indicators (1.2), business and DB transactions data (1.3), user/usage data including performance data, network data, application data, middleware data and platform data (1.4) and also by capturing external data (1.5). e.g. information ('buzz') from social networks concerning a new virus threat, etc.

The captured data are then operated on by the assimilation element 108 which can perform at Step 2, by example, data mining (2.1), scenario-based filtering (2.2), data classifying/clustering by placing the data into both pre-defined and newly discovered categories (2.3), analysis based on classification, association and content (2.4) and summarization of the data (2.5).

The processed (assimilated) data are then operated on by the modeling and analytics element 106 which can perform at Step 3, by example, behavior modeling and monitoring actions (3.1) such as SQL injection detection (3.1.1), user behavior patterns (detect anomalous user behaviors 3.1.2), detect anomalous communication patterns (3.1.3). DB auditing for data leakage detection (3.1.4), lateral movement detection (3.1.5) and the detection of un-maskable side effects of cyber threats (3.1.6). The modeling and analytics element 106 further operates to perform a 'what-if' analysis for various potential threats (e.g., cyber threats, human error threats) to determine appropriate counter-measure or counter-measures (3.2). The modeling and analytics element 106 further operates to perform cross-correlation across domains (3.3) and to perform simulation and risk analyses and uncertainty analyses.

The output(s) of the modeling and analytics element 106 are operated on by the decision and support element 104 which can at Step 4 determine 'best' decisions that can be made. This can include, by example, using the modeling and analytics results to identify real and potential threats (4.1) by estimating threat levels, prioritizing existing and potential threats and suggesting plans of action. The decision and support element 104 also operates, for example, to identify possible actions and countermeasures, to score the identified actions and countermeasures, and to prioritize the actions and countermeasures (e.g., based on their relative scores).

The output(s) of the decision and support element 104 are passed to the command and control element 102 which can at Step 5 execute proactive command and control actions to mitigate the possible presence of a cyber-threat and/or to mitigate and contain any damage caused by action of a cyber-threat. This can entail performing 'moving target' actions (5.1) such as randomizing IP addresses (5.1.1), migrating an application to another virtual machine (VM) or other VMs (5.1.2) and/or rebuilding server images (5.1.3). The command and control element 102 can also take proactive and reactive quarantine actions (5.2), migrate workloads from one VM instance to another (5.3) and; or scale-back actions based on resource availability (5.4).

It should be noted that the various numbered steps and processes described in FIG. 4 should not be construed as implying any particular and required temporal ordering of the steps and processes, or that they all be present in a particular instantiation, or that other not-illustrated steps and processes could be used in addition to or in place of the illustrated steps and processes.

Increasing global connectivity requires resilience of infrastructures at every level of business and government to significant increases in large-scale and cascading failures. Natural disasters, failure of information and communication technology (ICT) infrastructure, and intentional and unintentional human actions are all potential cyber-failure triggers. Variations in the nature of the triggers imply that any part of any system can become unreliable, unavailable, or untrustworthy at any time. Continuous monitoring and predictive analytics of environments, model-based reasoning, and orchestration of a proactive response as provided by the embodiments of this invention creates the backbone of a more resilient system. When applied within the underlying IT systems, physical systems, business applications, and services in a coordinated manner, an actual failure or a potential failure can be isolated in order to avoid an occurrence of cascading failures.

The embodiments of this invention provide a broad approach to proactively address the specific problem of cyber-security failures. The steps discussed above with respect to FIGS. 3 and 4 are employed, and although specific elements are listed, those with ordinary skill in the art will recognize that analogous or similar steps may be likewise employed. The following provides a summary of these steps and processes.

Capture 110: The governing system 100 captures data pertaining to the information technology environment. Examples of data captured include information on systems, workloads, user events, and any other particulars which may be needed for the modeling and analytics steps that follow. For example, changes to system configuration or workload may be collected for assessment. Furthermore, a lack of changes when such changes are expected, e.g., through normal variations of the work day or work week, may likewise be captured. Finally, any number of user events, of various classes including log-ons and log-offs, process commencement or termination, attempted account changes or accesses, attempts to change user log-on passwords and user names, or periods of prolonged activity or inactivity may likewise be captured for use by the governing system 100. In addition to the internal monitoring systems, other parts of the capture element system 110 can focus on external information capturing such as, by example only, alerts about potential outages, the "buzz" in the social media sphere concerning a new virus or a newly discovered vulnerability in a certain hardware or software system, or a planned cyber-attack. This type of information can be used to inform and influence the security policies and configurations of the governing system 100.

In general the capture element function 110 can be considered as implementing various types of sensors in and around the governed system 200. These sensors can be individually responsive to any number of possible inputs. In addition to those noted above, such as HTTP messages, DB transactions data such as SQL injection indicators, business and DB transactions data, user/usage data including performance data, network data, application data, middleware data and platform data, and external data, these sensors can be responsive to, as several exemplary and non-limiting examples, various operational characteristics of the governed system 200 such as CPU utilization, memory utilization, disk utilization, power utilization, network utilization (traffic usage, not necessarily the traffic messages themselves), network origin/destination pairs (i.e., the overall traffic matrix) and dynamic host configuration protocol (DHCP) messages. Any or all of these, and other, types of sensors and sensor inputs can be captured as data points and subsequently employed for the detection of potential cyber-security threats and failures.

Assimilation 108: Assimilation refers to the processes by which the governing system 100 makes use of these captured data points. It may involve placing the system, workload and/or the user event data into certain databases or repositories based on the collection method. It may further involve placing the data into certain locations based on a rough categorization of data type, time of collection, or data source. Additionally, assimilation also means that the governing system 100 may perform some first pass of filtering or screening on the data. Examples of this may be scenario-based filtering, or mining to obtain usable data. For example, in some scenarios, a 99.99% consistency rate may mean that outlier data (the 0.01%) may be discarded as noise, and thus irrelevant, while in other scenarios the 99.99% consistency rate may mean that such outlier data (the 0.01%) may be the data of most critical interest. In any of these and similar scenarios the assimilation step involves making the captured data ready to use by the modeling and analytics element 106. This step has the potential to perform very powerful analysis based on the current context of the computation. This can include both current events, histories of events, and patterns of events (e.g., see the step 2.4 analysis based on classification, association and content). In particular, one exemplary and possibly preferred embodiment of the invention may include the following steps (as discussed above): assimilate the captured data by performing data mining, perform the scenario-based filtering, classify and cluster data into predefined categories and discovered categories, analyze the captured data based on the context of the computation—this may include current events, histories of events, and patterns of events, and summarize the captured and possibly analyzed data.

Modeling and Analytics 106: The governing system 100 uses models and predictive analysis to determine anomalous user, network and, or system behavior. In particular, one exemplary embodiment of the invention may include performing the modeling and analytics actions by: detecting SQL injection frauds, e.g., malicious DB queries such as a query for user names and passwords, an SQL query having an unexpected size, an SQL query for a table access and not DB data per se, etc.; detecting anomalous user behaviors and/or anomalous communication patterns (e.g. repetitive log-ins by the same user, repetitive same-type user operations, etc.); detecting data leakage; detecting lateral movements (e.g., from one VM or system to another VM or system); and detecting un-maskable side effects of cyber-threats. These un-maskable side effects can include, but are not limited to: changes in the sizes of monitored files or in the memory footprints of software components; changes in signatures such as a cyclic redundancy check (CRC) codes; variations in the execution times of certain well-defined processes; references to unusual (unexpected) IP addresses (e.g., detectable from a monitored system IP stack); unusual patterns of CPU loading and other types of deep metrics.

This step of Modeling and Analytics 106 can also perform the what-if analysis for threat and countermeasure scenarios and can also perform the cross-correlation across domains, such as by analyzing comparative metrics across multiple CPUs or VMs running the same load.

Note that in some embodiments the governing system 100 may actually monitor multiple related or totally unrelated governed systems 200 and thus has the opportunity to observe patterns of behavior and metrics that span multiple governed systems. For example if multiple unrelated governed systems 200, that run the same version of a certain operating system in conjunction with the same version of a particular DB manager, begin to exhibit similar anomalous behavior then there may be indicated a potential cyber-threat associated with the certain operating system when paired with the particular DB manager. This enables the governing system 100 to proactively take action in those governed systems, as well as in other similarly situated governed systems that may not have yet exhibited the same anomalous behavior.

This step of Modeling and Analytics 106 can preferably also perform simulation, risk analysis, uncertainty analysis and other analytics to anticipate the presence of potential cyber-threats.

Decision Support 104: For mitigating the effect of cyber-security attacks, the governing system 100 makes use of the modeling and analytics results, combined with configurability of the governed system 200, to provide guidance and insights concerning 'best' decisions for proactively preventing cyber-attacks. These decisions can involve the use of system quarantine, workload migration (to another CPU or VM), a rebuild of server images and/or a randomization of IP addresses, among other techniques. For example, if a particular instance of a cyber-threat anticipates a use of certain IP addresses, then randomizing (changing) the used IP addresses can impede and/or terminate the operation of the cyber-threat. In particular, the embodiments of the invention can include at least some of the following to identify best decisions: use the modeling and analytics results to identify potential threats and identify and prioritize possible proactive and countermeasures actions.

Command and Control 102: In this step or process the proactive (and reactive) decisions, made in the Decision Support step 104, are transformed into actions that are adapted to the governed system 200 and executed within the governed system 200. These actions may include fine-grained isolation and quarantine; server image rejuvenation and or a fast workload migration to another CPU or VM. In particular, the embodiments of the invention may include some or all of the following in order to execute the proactive command and control actions: perform 'moving target' actions (e.g., by moving applicants and/or data to another real or virtual platform); randomization of IP addresses; migrate VMs; rebuild server images (rejuvenation); take proactive and reactive; quarantine actions; migrate workloads and/or scale-back based on resource availability.

The governing system 100 could be, in some embodiments, a secure chip or module that functions as a value-added add-on to a cloud computing environment that hosts various diverse governed systems 100.

As can be appreciated, in an aspect thereof the exemplary embodiments of this invention employ a model of system and/or user behavior to detect a deviation from the modeled behavior and to then take some proactive action or actions to mitigate a possibly adverse outcome of an operation made by, for example, a malicious cyber-security entity.

A further aspect of the embodiments of this invention is an ability to take some action or institute some counter-measure or counter-measures without actually having knowledge of the specifics of the underlying problem. That is, if the behavior of the governed system 200 deviates from some expected, modeled behavior then some corrective action or actions, previously determined to be effective when dealing with the same or similar deviation, can be taken proactively.

Figure 5:
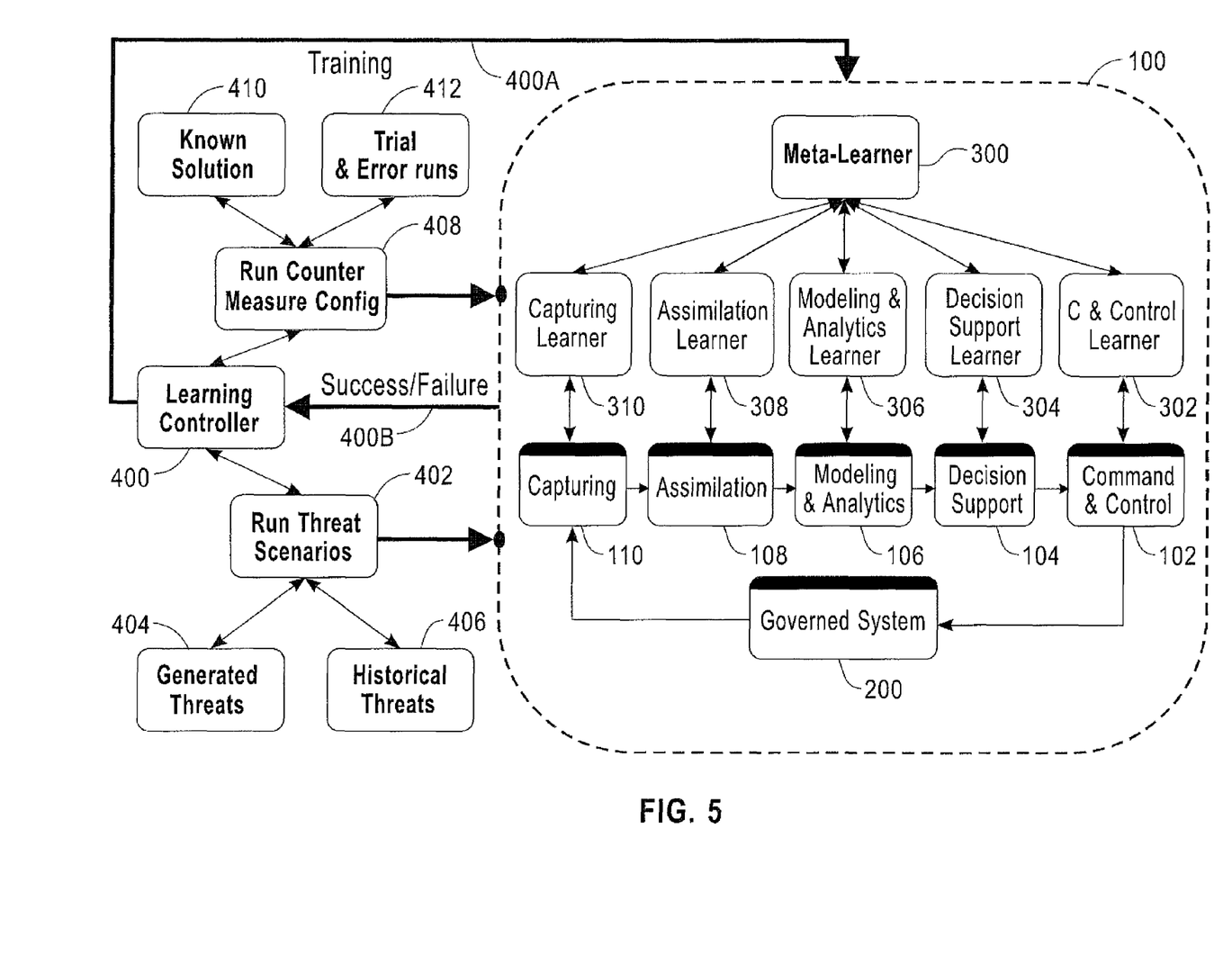
FIG. 5 is illustrative of a meta-learning orchestration embodiment of this invention to enable dynamic proactive actions of the governing system with respect to the governed system.

A further aspect of the exemplary embodiments of this invention is depicted in FIG. 5, more specifically a meta-learning orchestration approach to enable dynamic proactive actions of the governing system 100 with respect to the governed system 200. In this embodiment the governing system 100 includes a meta-learner element or component 300 that interacts with a plurality of specialized learning elements or components 302-310. In this non-limiting example each of the command and control 102, decision support 104, modeling and analytics 106, assimilation 108 and data capture 110 elements has an associated and specialized learning component 302-310 that feeds results to the meta-learner element or component 300 and that can receive feedback from the meta-learner element or component 300. In other embodiments there may not be a one-to-one correspondence between the command and control 102, decision support 104, modeling and analytics 106, assimilation 108 and data capture 110 elements and associated learning components.

In this aspect of the invention a learning controller 400 is part of or connected with the governing system 100. The learning controller 400 sends training-related information 400A to the meta-learner element or component 300 and receives success/failure feedback information 400B therefrom. Over time the meta-learning system operates to evolve more and improved counter-measures to detected actual and potential cyber-threats.

There are two major aspects of the meta-learner element or component 300 and the learning controller 400. A first aspect runs various threat scenarios 402 based on: (a) generated or synthesized possible threats 404 and on (b) a record of historical threats 406 (e.g., known viruses, known system outage/failure occurrences, known user errors, etc.) A second aspect of the meta-learner element or component 300 is an element 408 that runs various counter-measures configurations in response to the generated and historical threat scenarios. The counter-measures configurations 408 that are run include those based on (a) known (historical) solutions 410 to specific types of threats, and (b) trial and error runs 412, i.e., an attempted counter-measure that is run to determine if it has any value against a simulated particular type of threat (as indicated by the success/failure feedback information 400B.)

The meta-learner element or component 300 and related learning controller 400, etc., may form in some embodiments a part of the above-described Modeling and Analytics element 106.

Figure 6:
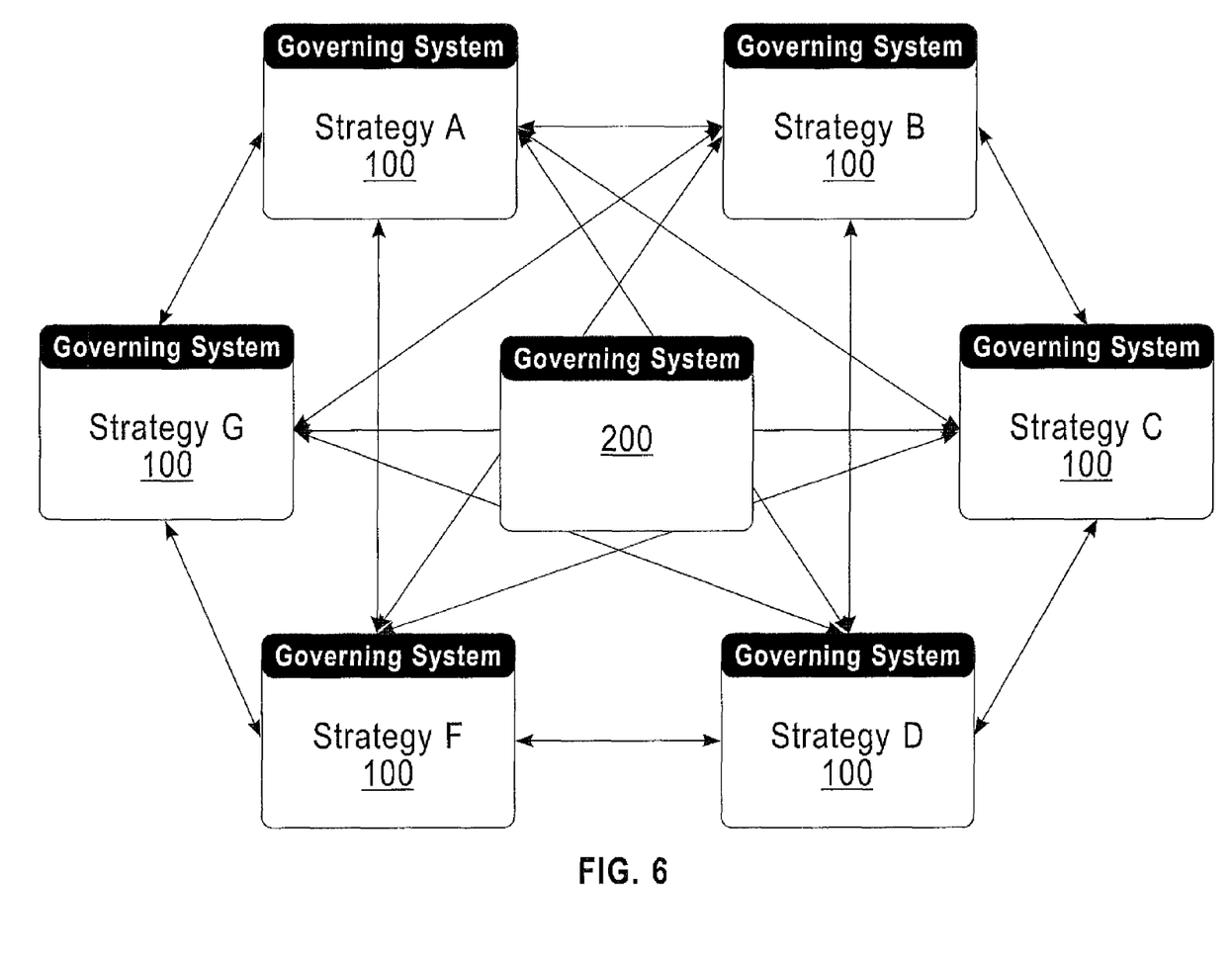
FIG. 6 shows a non-limiting example of a Byzantine fault-tolerant protocol that is adopted to solve a Byzantine agreement problem amongst multiple governing systems each operating with a different cyber-error mitigation strategy for a single governed system.

FIG. 6 shows an embodiment of this invention where a Byzantine fault-tolerant protocol is adopted to solve a Byzantine agreement problem amongst multiple governing systems 100, each governing system 100 operating with a different cyber-error mitigation strategy for a single governed system 200. As is known in the art Byzantine fault tolerant protocols are algorithms that are robust to arbitrary types of failures in distributed algorithms. The Byzantine fault tolerant protocols do not require any centralized control and have some guarantee of consistently working correctly. Implementation of a well-known Byzantine agreement protocol is an element of this task.

Figure 8:
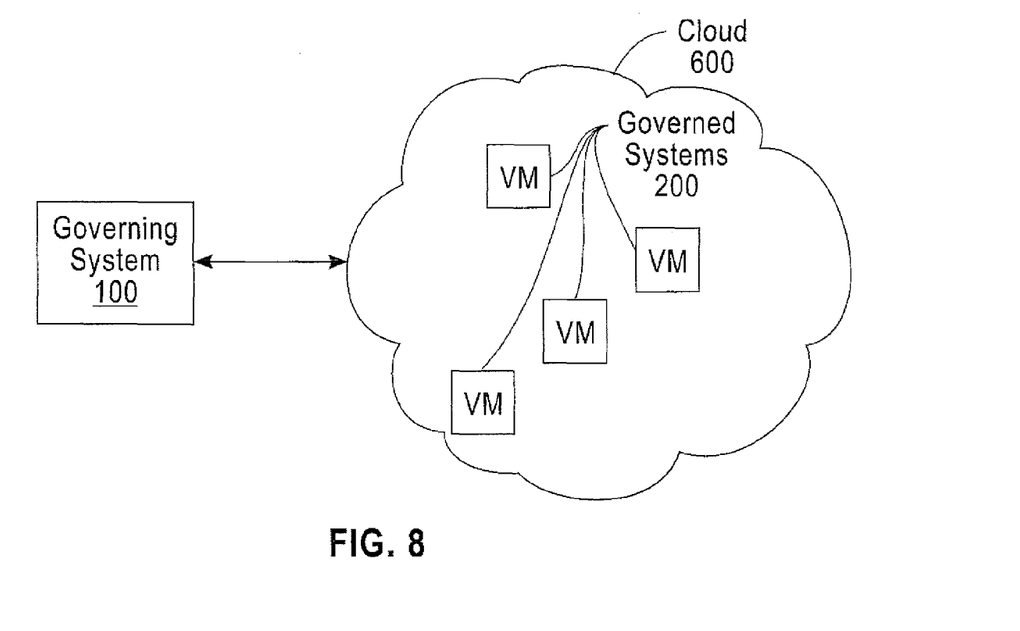
FIG. 8 is a simplified diagram showing an embodiment of the governing system bi-directionally coupled with a plurality of governed systems implemented as virtual machines in a cloud-based environment.

FIG. 8 is a simplified diagram showing an embodiment of the governing system 100, such as the system depicted in FIG. 7, bi-directionally coupled with a plurality of governed systems 200 implemented as virtual machines (VMs) in a cloud-based environment 600. The governing system 100 can be an add-on offered by the provider of the cloud 600 or it can be a standard feature of the cloud provider. The governing system 100 can be operated in accordance with any of the embodiments shown in FIGS. 2-7, including the multi-governing system Byzantine embodiment of FIG. 6. During operation the governing system 100 is enabled to monitor various ones of the governed systems 200, possibly observe trends across two or more of the governed systems 200, and can proactively prevent or mitigate occurrences of cyber-security failures due to human and other errors, as well as those due to malicious actors. In some embodiments there can be multiple governing systems 100 provided, with each being responsible for monitoring one of more of the governed systems 200. As was noted above, depending on the OS specifics of the governed systems 200 there can be multiple governing systems 100 provided with a different type of OS 508.

An aspect of the embodiments of this invention is to provide a method, a computer program and a system configured to operate a governed data processing system in concert with a governing data processing system. Method steps and computer program operations comprise operating the secure governing data processing system to monitor operation of at least one governed data processing system to detect a deviation from modeled user and governed data processing system behavior and, upon detecting a deviation from the modeled behavior, taking proactive action to mitigate an occurrence of a potential adverse result of an occurrence of a cyber-security threat. Taking proactive action can be accomplished by taking some action or instituting some counter-measure prior to having actual knowledge of a cause of the deviation from the modeled behavior, in order to disturb any malicious activity before it starts, or before it propagates further. Monitoring operation of the at least one data processing system can comprise capturing data from the at least one governed data processing system, assimilating the captured data, performing modeling, monitoring and analyzing of the assimilated data; using the modeling, monitoring and results of the analyzing to identify a potential cyber-threat and to suggest at least one action or countermeasure to be taken to counter the potential cyber-threat, and implementing at least one of the suggested actions or countermeasures.

Implementing at least one of the suggested actions or countermeasures can comprise performing moving target actions including at least one of migrating an application or a workload and rebuilding a software image; performing a quarantine action; and performing a scaling back action. The moving target actions can comprise changing IP addresses, and migrating an application or a workload can comprise migrating the application or workload from one virtual machine to another virtual machine or from one CPU to another CPU.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a circuit, module or system. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RR etc., or any suitable combination of the foregoing.

Computer program code for carrying out operations for aspects of the present invention may be written in any combination of one or more programming languages, including an object oriented programming language such as Java. Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method to operate a governed data processing system in concert with a governing data processing system, comprising:
    operating a secure governing data processing system to monitor operation of at least one governed data processing system to detect a deviation from modeled user and governed data processing system behavior; and
    upon detecting a deviation from the modeled behavior taking proactive action to mitigate an occurrence of a potential adverse result of an occurrence of a cyber-security threat;
    where operating the secure governing data processing system to monitor operation of the at least one governed data processing system comprises capturing data from the at least one governed data processing system, assimilating the captured data, performing modeling, monitoring and analyzing of the assimilated data; using the modeling, monitoring and results of the analyzing to identify a potential cyber-threat and to suggest at least one action or countermeasure to be taken to counter the potential cyber-threat, and in response to identifying a potential cyber-threat and suggesting at least one action or countermeasure, initiating in the governing data processing system a proactive command and control process to transform into an executable action the at least one suggested action or countermeasure for proactively implementing the at least one suggested action or countermeasure, the executable action being adapted to the governed data processing system and executed within the governed data processing system;
    wherein there are a plurality of data processing systems that are monitored by the secure governing data processing and where performing modeling, monitoring and analyzing of the assimilated data considers assimilated data captured from the plurality of governed data processing systems to detect occurrences of anomalous behavior in the plurality of governed data processing systems; and
    in response to detecting an occurrence of anomalous behavior in one of the plurality of governed data processing systems, taking proactive action to mitigate an occurrence of the anomalous behavior in another one of the governed data processing systems that has not exhibited the anomalous behavior.

2. The method as in claim 1, where capturing data comprises at least one of capturing network traffic, capturing database transactions, capturing operational characteristics of the governed data processing system and capturing data generated by a user of the governed data processing system.

3. The method of claim 2, where capturing data further comprises capturing data external to the governed data processing system.

4. The method of claim 1, where assimilating the captured data comprises at least one of data mining, data filtering, data classification and clustering, analysis based on classification, association and content of the captured data and summarization of the captured data.

5. The method as in claim 1, where performing modeling, monitoring and analyzing of the assimilated data comprises at least one of detecting database injections, detecting user behavior patterns, detecting communication patterns, detecting data leakage, detecting lateral movement and detecting an un-maskable side effect of a cyber-threat.

6. The method of claim 5, where performing modeling, monitoring and analyzing of the assimilated data further comprises perform an analysis of potential threats to determine appropriate counter-measure or counter-measures to the potential threats.

7. The method of claim 1, where the occurrence of anomalous behavior is detected in a governed data processing system that is unrelated to the another one of the governed data processing systems.

8. The method as in claim 1, where using the modeling, monitoring and results of the analyzing comprises estimating threat levels, scoring and prioritizing existing and potential threats and suggesting actions and countermeasures to be taken.

9. The method as in claim 8, where suggested actions and countermeasures are prioritized based on the scoring and prioritization of the existing and potential threats.

10. The method as in claim 1, where implementing at least one of the suggested actions or countermeasures comprises performing moving target actions including at least one of migrating an application or a workload and rebuilding a software image; performing a quarantine action; and performing a scaling back action.

11. The method as in claim 10, where moving target actions comprise changing IP addresses, and where migrating an application or a workload comprises migrating the application or workload from one virtual machine to another virtual machine.

12. The method as in claim 10, where moving target actions comprise changing IP addresses, and where migrating an application or a workload comprises migrating the application or workload from one CPU to another CPU.

13. The method as in claim 1, where taking proactive action is accomplished by taking some action or instituting some counter-measure prior to having actual knowledge of a cause of the deviation from the modeled behavior.

14. The method as in claim 1, further comprising operating a learning element by running cyber-threat scenarios against the at least governed data processing system and running counter-measure configurations in response to the cyber-threat scenarios in order to determine a set of counter-measures that are effective to deal with a particular cyber-threat scenario.

15. The method as in claim 14, where the cyber-threat scenarios are selected from generated threats and historical threats, and where the counter-measure configurations are selected from trial-and-error counter-measure configurations and known counter-measure configurations.

16. The method as in claim 1, where there are a plurality of governing data processing systems coupled with a governed data processing system and operating with a *Byzantine* fault-tolerant protocol configured to solve a *Byzantine* agreement problem amongst the plurality of governing data processing systems, each operating with a different cyber-error mitigation strategy.

17. The method as in claim 1, where the captured data is received at the secure governing data processing system as encrypted data and is decrypted within the secure governing data processing system.

18. The method as in claim 1, where the at least one governed data processing system is instantiated as at least one virtual machine in a cloud computing environment.

19. The method as in claim 1, performed as a result of execution of computer program code by at least one data processor that comprises a part of the secure governing data processing system.

20. A non-transitory computer-readable medium has a program of computer-executable instructions configured, when executed by at least one computer, to perform operations comprising:
　operating a secure governing data processing system to monitor operation of at least one governed data processing system to detect a deviation from modeled user and governed data processing system behavior; and
　upon detecting a deviation from the modeled behavior taking proactive action to mitigate an occurrence of a potential adverse result of an occurrence of a cyber-security threat;
　where operating the secure governing data processing system to monitor operation of the at least one governed data processing system comprises capturing data from the at least one governed data processing system, assimilating the captured data, performing modeling, monitoring and analyzing of the assimilated data; using the modeling, monitoring and results of the analyzing to identify a potential cyber-threat and to suggest at least one action or countermeasure to be taken to counter the potential cyber-threat, and in response to identifying a potential cyber-threat and suggesting at least one action or countermeasure, initiating in the governing data processing system a proactive command and control process to transform into an executable action the at least one suggested action or countermeasure for proactively implementing the at least one suggested action or countermeasure, the executable action being adapted to the governed data processing system and executed within the governed data processing system;
　wherein there are a plurality of governed data processing systems that are monitored by the secure governing data processing system and where performing modeling, monitoring and analyzing of the assimilated data considers assimilated data captured from the plurality of governed data processing systems to detect occurrences of anomalous behavior in the plurality of governed data processing systems; and
　in response to detecting an occurrence of anomalous behavior in one of the plurality of governed data processing systems, taking proactive action to mitigate an occurrence of the anomalous behavior in another one of the governed data processing systems that has not exhibited the anomalous behavior.

21. The computer-readable medium as in claim 20, where the operation of capturing data comprises at least one of capturing network messages, capturing database transactions, capturing operational characteristics of the governed data processing system, capturing data generated by a user of the governed data processing system, and capturing data external to the governed data processing system, and where the operation of assimilating the captured data comprises at least one of data mining, data filtering, data classification and clustering, analysis based on classification, association and content of the captured data and summarization of the captured data.

22. The computer-readable medium as in claim 20, where the operation of performing modeling, monitoring and analyzing of the assimilated data comprises at least one of detecting database injections, detecting user behavior patterns, detecting communication patterns, detecting data leakage, detecting lateral movement and detecting an un-maskable side effect of cyber-threat; where the operation of performing modeling, monitoring and analyzing of the assimilated data further comprises performing an analysis of potential threats to determine appropriate counter-measure or counter-measures to the potential threats and considering the assimilated data captured from the plurality of governed data processing systems to detect anomalous cross-domain occurrences.

23. A data processing system comprising:
at least one data processor comprising part of a secure governing data processing system;
an interface for conducting data between the governing data processing system and at least one governed data processing system; and
at least one non-transitory computer-readable medium that stores at least one program comprised of computer-executable instructions configured, when executed by the at least one data processor, to perform operations that comprise,
monitoring operation of the at least one governed data processing system to detect a deviation from modeled user and governed data processing system behavior; and
upon detecting a deviation from the modeled behavior taking proactive action to mitigate an occurrence of a potential adverse result of fan occurrence of a cyber-security threat, where taking proactive action comprises taking some action or instituting some counter-measure prior to having actual knowledge of a cause of the deviation from the modeled behavior in order to disturb any malicious activity before it begins or before it propagates further;
where monitoring operation of the at least one governed data processing system comprises capturing data from the at least one governed data processing system, assimilating the captured data, performing modeling, monitoring and analyzing of the assimilated data; using the modeling, monitoring and results of the analyzing to identify a potential cyber-threat and to suggest at least one action or countermeasure to be taken to counter the potential cyber-threat, and in response to identifying a potential cyber-threat and suggesting at least one action or countermeasure, initiating in the governing data processing system a proactive command and control process to transform into an executable action the at least one suggested action or countermeasure for proactively implementing the at least one suggested action or countermeasure, the executable action being adapted to the governed data processing system and executed within the governed data processing system;
wherein there are a plurality of governed data processing systems that are monitored by the secure governing data processing system and where performing modeling, monitoring and analyzing of the assimilated data considers assimilated data captured from the plurality of governed data processing systems to detect occurrences of anomalous behavior in the plurality of governed data processing systems; and
in response to detecting an occurrence of anomalous behavior in one of the plurality of governed data processing systems, taking proactive action to mitigate an occurrence of the anomalous behavior in another one of the governed data processing systems that has not exhibited the anomalous behavior.

24. The data processing system as in claim 23, where the operation of capturing data comprises at least one of capturing network messages, capturing database transactions, capturing operational characteristics of the governed data processing system and capturing data generated by a user of the governed data processing system, where the operation of assimilating the captured data comprises at least one of data mining, data filtering, data classification and clustering, and analysis based on classification, association and content of the captured data and summarization of the captured data, where the operation of performing modeling, monitoring and analyzing of the assimilated data comprises at least one of detecting database injections, detecting user behavior patterns, detecting communication patterns, detecting data leakage, detecting lateral movement and detecting an un-maskable side effect of cyber-threat, and where the operation of using the modeling, monitoring and results of the analyzing comprises estimating threat levels, scoring and prioritizing existing and potential threats and suggesting actions and countermeasures to be taken.

25. The data processing system as in claim 23, where the operation of performing modeling, monitoring and analyzing of the assimilated data further comprises perform an analysis of potential threats to determine appropriate counter-measure or counter-measures to the potential threats, and further comprises considering the assimilated data captured from the plurality of governed data processing systems to detect anomalous cross-domain occurrences, and where the operation of implementing at least one of the suggested actions or countermeasures comprises performing moving target actions including at least one of migrating an application or a workload and rebuilding a software image; performing a quarantine action; and performing a scaling back action, where moving target actions comprise changing IP addresses, and where migrating an application or a workload comprises migrating the application or workload from one virtual machine to another virtual machine or migrating the application or workload from one CPU to another CPU.

* * * * *